(12) United States Patent
Oscar (10) Patent No.: US 10,109,988 B2
(45) Date of Patent: Oct. 23, 2018

(54) BALANCING AND SYNCHRONIZING DEVICE FOR MACHINES FOR LAYING CABLES

(75) Inventor: Alberto Oscar, Castro (IT)

(73) Assignee: TESMEC SPA, Milan (IT)

( * ) Notice: Subject to any disclaimer, the term of this patent is extended or adjusted under 35 U.S.C. 154(b) by 1178 days.

(21) Appl. No.: 13/702,760

(22) PCT Filed: Jun. 8, 2011

(86) PCT No.: PCT/IB2011/001271
§ 371 (c)(1),
(2), (4) Date: Feb. 19, 2013

(87) PCT Pub. No.: WO2012/035383
PCT Pub. Date: Mar. 22, 2012

(65) Prior Publication Data
US 2013/0146826 A1    Jun. 13, 2013

(30) Foreign Application Priority Data
Jun. 9, 2010 (IT) .............................. UD2010A0111

(51) Int. Cl.
*H02G 1/02* (2006.01)
*H02G 1/04* (2006.01)
*H02G 1/06* (2006.01)

(52) U.S. Cl.
CPC ................. *H02G 1/04* (2013.01); *H02G 1/06* (2013.01)

(58) Field of Classification Search
CPC .................................... H02G 1/04; H02G 1/06
See application file for complete search history.

(56) References Cited

U.S. PATENT DOCUMENTS

| | | | | |
|---|---|---|---|---|
| 6,426,705 B1 * | 7/2002 | Wischoeffer | ........... | G08C 17/00 340/12.27 |
| 7,264,226 B2 * | 9/2007 | Smith | ................. | F16M 11/18 254/103 |

FOREIGN PATENT DOCUMENTS

| | | |
|---|---|---|
| CN | 1262541 | 8/2000 |
| EP | 1282210 | 2/2003 |

(Continued)

*Primary Examiner* — David Bryant
*Assistant Examiner* — Nirvana Deonauth
(74) *Attorney, Agent, or Firm* — Hamre, Schumann, Mueller & Larson, P.C.

(57) ABSTRACT

Balancing and synchronizing device for a plant (10) comprising one or more brake machines (12) for laying cables (11), each of which comprises a plurality of unwinding members each provided with at least a pair of capstans (14). The device comprises a plurality of control units (22, 22a), configured to automatically adjust the unwinding tension of each individual cable (11), and user interface means (18), independently connected to each control unit (22, 22a), so as to set predetermined functional and operating parameters of each pair of capstans (14). Each control unit (22, 22a) is connected to detector elements (21) of a corresponding pair of capstans (14). The device comprises a data transmission and reception line (25) to which the control units (22, 22a) are connected for at least a part of the laying cycle. The device comprises at least a main control unit (22a) provided with synchronization command means (30) to command, by means of the data transmission and reception network (25), the other control units (22) for the synchronized balancing and drive of the relative pairs of capstans (14), on the basis of specific functional and operating parameters set by the user interface means (18a) of the main control unit (22a) and of the signals received from the position detector elements (21).

5 Claims, 5 Drawing Sheets (56) References Cited

FOREIGN PATENT DOCUMENTS

WO 2004/023617 3/2004
WO 2009/0780944 6/2009

* cited by examiner fig. 2a fig. 2b fig. 3 fig. 4 fig. 5 fig.6

BALANCING AND SYNCHRONIZING DEVICE FOR MACHINES FOR LAYING CABLES

FIELD OF THE INVENTION

The present invention concerns a balancing and synchronizing device used in machines for laying and stretching cables, such as electric conductors, lines, optic fibers or similar, or for replacing them.

The device is applied to two or more machines, suitable to lay the cables of aerial electric lines, data distribution lines, railway lines or similar and in particular to the machine on the brake side.

The device according to the present invention is applied, in particular, to a plurality of machines each of which comprises at least one, advantageously two or more, pairs of motorized capstans in order to simultaneously feed respective cables, fibers etc. The device also comprises adjustment and synchronization means able to guarantee a constant alignment of all the cables, even fed from different machines, during the laying and stretching operations.

BACKGROUND OF THE INVENTION

It is known that in the laying of cables of aerial electric lines, data distribution lines, railway lines or others, plants are used which realize the principle of "braked stretching", whereby one or more "winch" machines recover one or more lines or old conductors to be substituted (re-conductoring) and one or more "brake" machines brake the new conductors during laying in order to guarantee a geometric configuration of the span which avoids interference with natural and/or artificial obstacles. In their turn, the laying machines comprise one or more combined pairs of capstans which drive the respective hydraulic pumps and the relevant hydraulic circuits, in order to be able to lay simultaneously one or more cables at a time.

Synchronization devices are also known for the "winch" or "brake" machines of the laying plants in order to carry out the operations of laying, stretching and/or substitution of electric cables, optic fibers, lines or similar.

An example of a known synchronizing device is described in the patent application No. WO2009/078044 in the name of the Applicant. This known synchronizing device comprises automatic adjustment means to adjust the recovery speed of each individual cable to the winch station, such as a position detector associated to each individual capstan of each individual winch or brake.

The adjustment means also comprise at least a control unit connected to each pair of capstans of each machine of the winch station; the control unit intervenes, in relation to the signals coming from the position detectors, on the members that command and adjust the rotation speed of the respective capstans of each machine. In this way it is possible to recover several cables substantially at the same speed, and to control the recovery speed of the cables of the traction/recovery members in an independent way, by means of the associated control unit, so as to avoid possible misalignments of the cables.

Each machine is controlled by means of a corresponding command user interface, such as for example an adjustment "joystick", so that it is thus possible to modify, even dynamically during their functioning, the relative work or functional parameters.

One disadvantage of this synchronizing device is that, although it allows to carry out a substantially independent adjustment of the rotation speed of each pair of capstans to the winch station, as the number of cables which are simultaneously laid increases, so does the probability of generating possible imbalances in the laying configuration of the cables, depending on the different operating conditions under which the cables are laid.

Indeed the difference in performance of each laying circuit, such as for example the different efficiency of the individual pulleys installed on the towers, the different geometries of each catenary determined by angles or non-linear developments of the span of the cables, the different yields of the hydraulic control circuits to the brake machines can generate misalignments in the group of conductors, even though the heads are recovered at the same speed. Therefore one or more cables have a laying profile which differs with respect to that of a reference conductor.

This disadvantage is even greater when the conductors are laid following a traditional procedure in which, with a single pulling line at the winch side, several conductors are recovered by using a head-board or running board, which allows to connect a line to a multiple number of conductors. In this situation what we described before can easily happen, and that is, despite a uniform recovery speed to the winch machine, because it is associated to a single line, there are imbalances and misalignments of the conductor cables because of the different operating conditions of the individual spans and/or of the individual adjustment circuits to adjust the brake machines.

Other known synchronization devices of the circuits on the brake side are based on a partial mechanical connection of the same, with limitation of the torque that can be transmitted, the application of which allows to partially balance the differences in tension between conductors and adjacent circuits thanks to the connection between them. This solution is costly, however, in terms of mechanical production and is expensive to extend to multiple machines which are not physically connected to each other.

Other known synchronization devices of circuits on the brake side are based on a hydraulic or electric connection of the command members so that they can be operated with similar hydraulic or electric values for every circuit. Such devices do not however allow to compensate or correct differences in tension in the cables themselves, or geometric imbalances between them, because they do not guarantee the independent adjustment of each circuit.

Therefore the supervision and/or the adjustment of specific working or functional parameters which allow to determine a homogenous effect for each controlled laying circuit is not an easy operation for an operator working on the brake machine or machines. In particular, in order to keep the adjustment of each individual cable simultaneous, the operators must simultaneously control different user interfaces, one for each machine and each generally with multiple commands, and it is therefore difficult to maintain a desired alignment and synchronized execution as the number of cables laid increases.

One purpose of the present invention is to achieve a balancing and synchronizing device for machines for laying cables which allows to control the functioning of two or more cable laying machines on the brake side, adjusting the laying or drawing tension substantially simultaneously and independently for each individual circuit, minimizing possible positioning imbalances.

A further purpose of the present invention is to achieve a balancing and synchronizing device for cable laying machines on the brake side in which specific work parameters can be easily adjusted by a single operator irrespective of the number of circuits connected.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, a balancing and synchronizing device according to the present invention is applied in plants comprising two or more cable laying machines, such as for example brakes or winch-brakes, distinct and independent from each other.

Each laying machine has a plurality of unwinding members comprising at least a pair of capstans, advantageously two or more, able to lay the cables.

The balancing and synchronizing device according to the present invention comprises a plurality of control units, able to automatically adjust the unwinding tension of each individual cable, and user interface means, independently connected to each of the control units in order to set predetermined functional and operating parameters of each pair of capstans. Each control unit is connected to corresponding detector elements of a corresponding pair of capstans of each machine.

Each control unit is suitable to intervene, in relation to the signals arriving from the position detector means and to the functional and operating parameters set, to command and adjust the mechanical torque applied to the respective capstans of each individual machine and consequently the tension applied to the individual conductors.

According to one feature of the present invention, the control units of the two or more laying machines are connected to each other, at least for one step of the laying cycle, by means of a data transmission and reception line. The balancing and synchronizing device also comprises a main control unit, which is provided with synchronization command means able to command, through the data transmission and reception network, the other control units for the balancing and synchronous drive of the relative pairs of capstans, according to the specific functional and operating parameters set by means of the user interface means of the main control unit and to the signals received by the position detector elements.

According to one solution of the present invention, the data transmission and reception line is cabled.

According to another solution of the present invention, the data transmission and reception line is a radio-frequency line.

According to another solution of the present invention, the data transmission and reception line comprises a cabled sub-line and a radio-frequency sub-line, connected to each other.

Therefore, the balancing and synchronizing device according to the present invention allows to control all the connected machines in a synchronous manner, adjusting the mechanical torque applied to the relative pairs of capstans and the laying tension of the cables, obtaining a substantially homogeneous balance of all the cables. This therefore allows to minimize or eliminate possible differences in the geometries of the catenaries of the cables and to compensate for the different efficiencies of the components of the individual independent laying circuits.

According to another feature of the present invention, the synchronization command means are suitable for the selective enablement to use the user interface means of the main control unit, at the same time disabling the use of the user interface means of the other control units, through the data transmission and reception line.

Therefore, the balancing and synchronizing device according to the present invention allows to control and supervise the different laying machines by an individual operator, thus facilitating the various operating steps.

According to a variant of the present invention, the user interface means comprise at least a main potentiometric adjuster able to adjust the working pressure of the corresponding hydraulic drive circuits associated with the pairs of capstans and hence the tension applied to each cable.

According to another variant of the present invention, the position detector elements are also able to detect the instantaneous laying speed and/or the length of each cable laid, and to transmit said data by means of the associated control unit and through the data transmission and reception line, to the other control units so as to instantaneously compare the instantaneous laying speed and/or the length of each cable laid with a reference laying speed and/or a reference laying length.

Since differences in the configuration of the individual conductors in the span, associated with differences in the tension thereof, translate into a different development or length, and different speeds of each individual cable, the balancing and synchronizing device according to the present invention allows to adjust the laying speed of each cable, that is, the speed of rotation of each independent pair of capstans, making it as close as possible to a reference speed, such as a set operating speed, a laying speed of a specific reference cable or a mean reference value relating to the plurality of circuits controlled, varying proportionally the adjustment pressure of each individual independent circuit, and hence the tension of the corresponding cable.

The present invention also concerns a method for laying cables in plants comprising one or more brake or winch-brake machines, distinct and independent from each other as described before.

The method comprises a setting step in which, by means of a plurality of control units, each connected to corresponding position detector elements of a corresponding pair of capstans of each machine and user interface means, independently connected to each of the control units, predetermined functional and operating parameters of each pair of capstans are set.

The method comprises a laying step in which, by means of each control unit, the unwinding tension of each individual cable is automatically adjusted, according to the signals arriving from the position detector elements and to the functional and operating parameters set.

According to one feature of the present invention, the method comprises a synchronization step in which the control units of one or more "brake" or "winch-brake" machines, and in particular the multiple circuits made by them, are reciprocally connected by means of a data transmission and reception line, such as a cabled and/or radio-frequency transmission and reception line. During the synchronization step, by means of synchronization command means associated with at least one main control unit, all the control units are synchronized through the data transmission and reception network, in order to drive the relative pairs of capstans, according to the specific functional and operating parameters set and to the signals received from the position detector elements in order to lay the cables automatically at the same laying speed.

According to another feature of the present invention, the synchronization step comprises a disabling sub-step in which, by means of the synchronization command means, the user interface means of the main control unit are enabled for use by an operator and the user interface means of the other control units are disabled from use.

According to a variant of the present invention, during the setting step and/or the laying step, by means of at least a main potentiometric adjuster, the working pressures of hydraulic drive circuits, associated with the pairs of capstans, are adjusted.

According to another variant of the present invention, during the laying step, by means of the position detector elements, the instantaneous laying speed and/or length of each cable laid is detected, and transmitted, by means of the data transmission and reception line, to the other control units so as to instantaneously compare the instantaneous laying speed and/or length with a reference laying speed and/or reference length in order to adjust each laying speed of each cable according to the deviations detected by acting on the pressure of the command circuits of the individual pairs of capstans.

BRIEF DESCRIPTION OF THE DRAWINGS

These and other characteristics of the present invention will become apparent from the following description of a preferential form of embodiment, given as a non-restrictive example with reference to the attached drawings wherein.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF A
PREFERENTIAL FORM OF EMBODIMENT

Figures 1A, 1B:
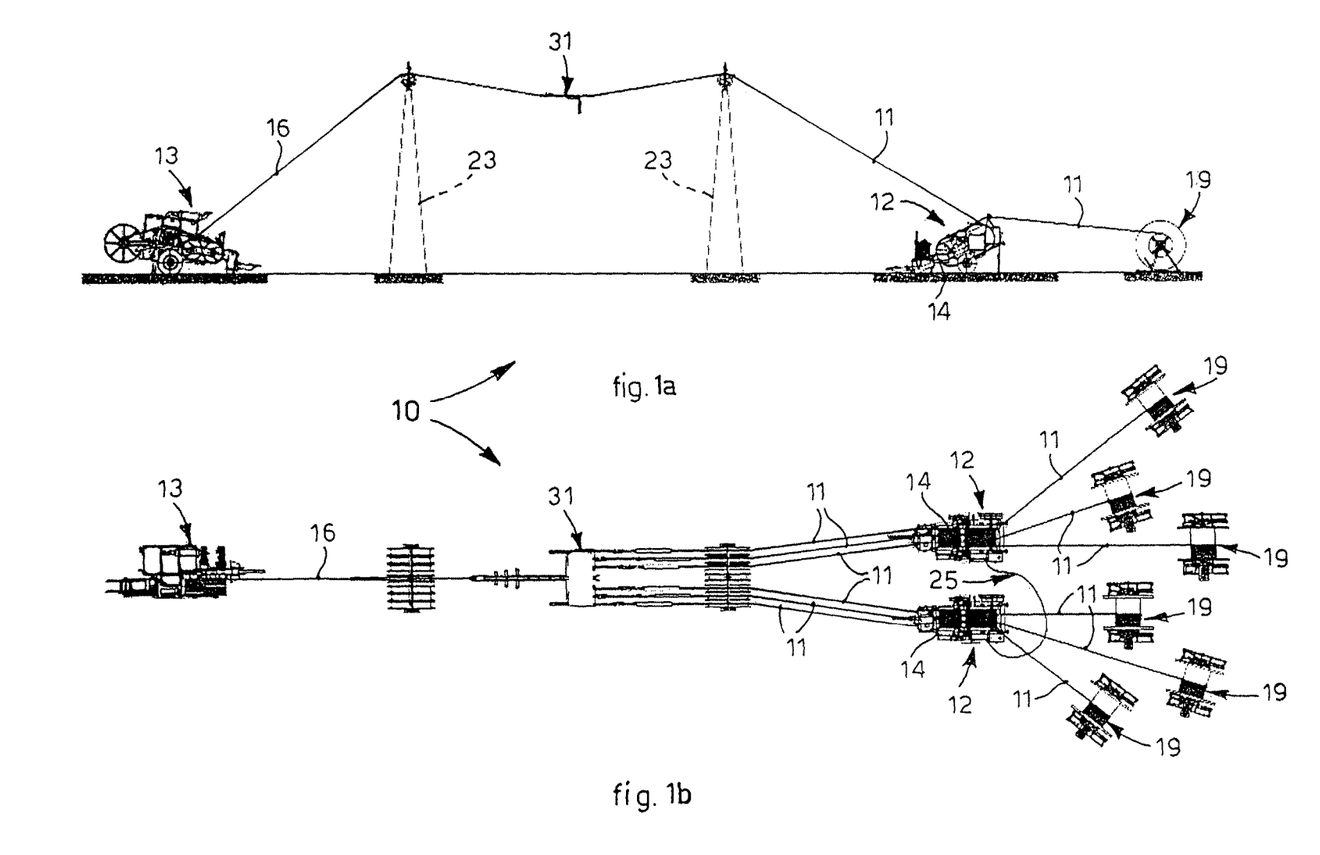
FIGS. 1a, 1b and 2a, 2b show schematically, with respective side views and from above, a laying plant in which the balancing and synchronizing device according to the present invention is applied, respectively for traditional laying with an individual cable and for laying with multiple cables and/or re-conductoring.
Figure 2A:
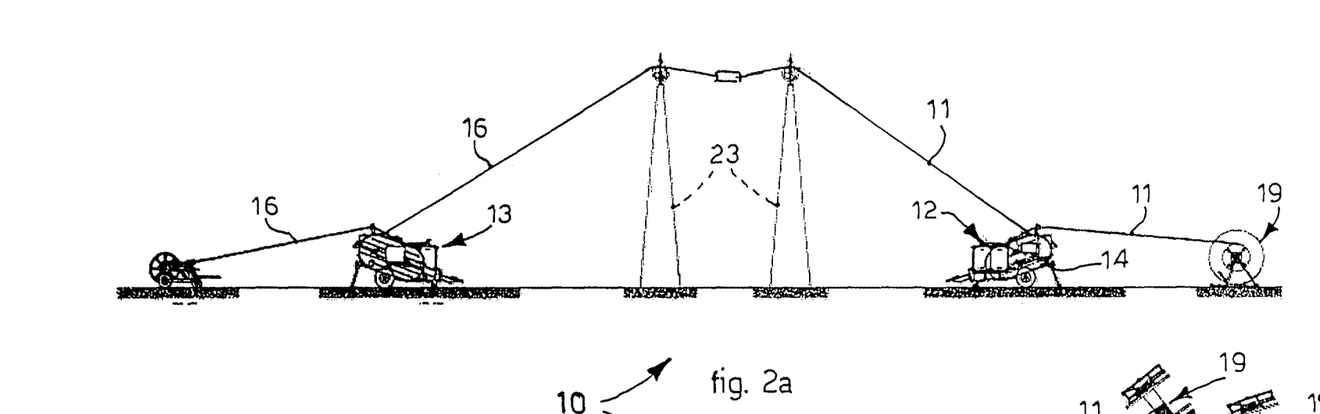
Figure 2B:
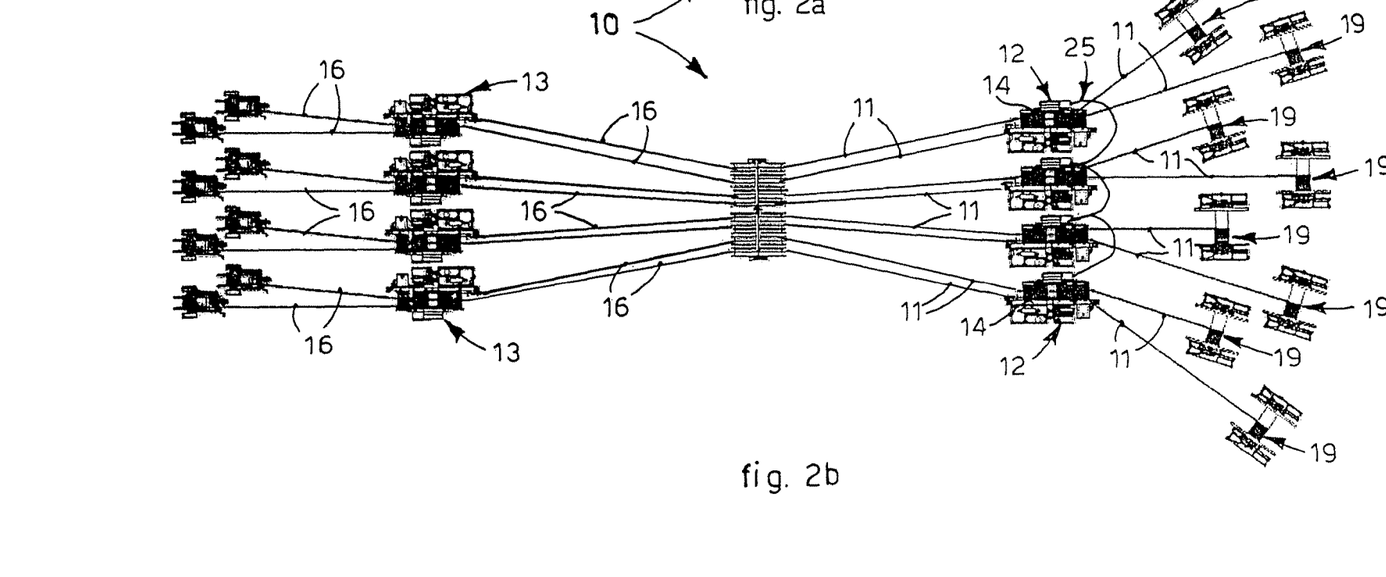
Figure 3:
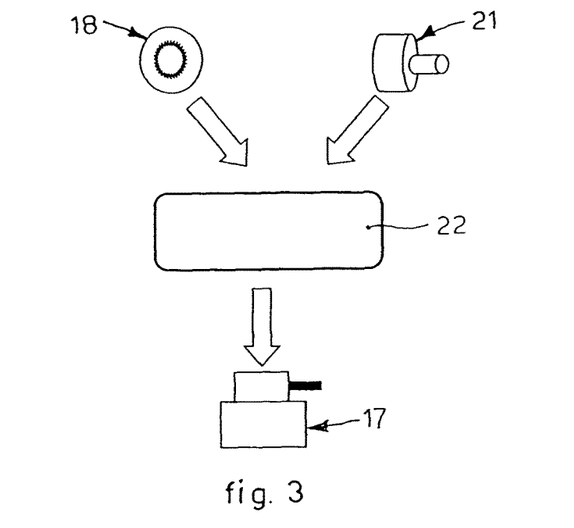
FIG. 3 shows schematically the functioning principle of the control and adjustment means.

With reference to the attached drawings, a balancing and synchronizing device 20 according to the present invention is used in a plant 10 for laying a plurality of lines of conductors 11 or cables, optic fibers, lines or suchlike, and comprises a plurality of brake machines 12 for laying cables, two in the case shown in FIGS. 1a and 1b and four in the case shown in FIGS. 2a and 2b, each provided with one or more unwinding members, or capstans 14, and one or more corresponding winch machines 13 and a synchronizing device 20.

The laying brake machines 12 and the traction/recovery machines 13 can be winch machines, brake machines or winch-brake machines, or combined so as to selectively perform both the function of winch and the function of brake.

The brake machines 12 and the winch machines 13 are positioned on opposite sides with respect to pylons 23 between which the conductors 11 are stretched.

Each machine 12, 13 consists of one or more pairs of capstans 14 disposed on two parallel axes on which the conductors 11 to be laid (brake side) are able to be wound and then unwound or on which the drawing cables 16 of the individual conductors 11 are able to be wound (winch side).

In this case, with reference to FIGS. 1a and 1b, there are three pairs of independent capstans 14 on the brake machines 12 and one pair of independent capstans on the winch machine 13, whereas, with reference to FIGS. 2a and 2b, there are two pairs of independent capstans 14 on each of the winch or brake machines.

On each brake machine 12 the conductors 11 are fed by respective reels 19 disposed upstream of the respective pairs of capstans 14.

On each pair of capstans 14 of the winch machines 13, a drawing cable 16 is wound.

With reference to FIGS. 1a and 1b, the drawing cable 16 has its end firmly connected to a return device 31, or head board, to which the conductors 11 being laid by the pairs of capstans 14 of the corresponding laying brake machine 12 are connected on the opposite side.

With reference to FIGS. 2a and 2b, the drawing cable 16 of each pair of capstans 14 has one end firmly connected to the end of a corresponding conductor 11 unwinding from the pair of capstans 14 of the corresponding brake machine 12. In this way, each drawing cable 16 draws and stretches a relative conductor 11.

It is understood that the same principle is applied to different configurations or working situations of the laying plant.

Each pair of capstans 14 of the brake machines 12 drives a respective hydraulic pump 15, by means of a transmission with gears 14a and 14b and a speed reducer 32; the pump 15 is suitable to send the hydraulic oil to a valve 17 that exerts a hydraulic pressure needed to create the braking effect on the capstans 14, and consequently guarantee the desired tension on the conductors wound onto the pair of capstans. The valve 17 is in turn commanded, indirectly, by a relative adjustment potentiometer 18.

It is understood that the kinematic transmission can also be achieved by means of specific pumps mounted directly on the capstans, with or without the use of a speed reducer 32, and in any case without the relative gears 14a and 14b.

The balancing and synchronizing device 20 is applied preferably but not exclusively to all machines that perform the laying function (brake), so as to synchronize the drive thereof.

The device 20 comprises a plurality of position detectors, for example of the encoder type 21, each associated with a gear or crown 14a of a relative capstan 14 for every pair, and able to detect the instantaneous angular position and hence the speed of rotation of each pair of capstans 14 that drive the same pump 15.

The balancing and synchronizing device 20 also comprises, for each brake machine 12, a control card 22 for each pair of independent capstans 14, connected to the relative encoder 21; the control cards 22, of the same machine and of different machines, are reciprocally connected by means of a data transmission and reception line 25, such as a cabled bus line of a known type, or a radio-frequency line, or a line comprising a cabled transmission and reception sub-line and a radio-frequency transmission and reception sub-line, for example for the connection of two distinct machines.

Each control card 22 is suitable to compare, in relation to the signals provided by the corresponding position detectors 21, the speeds of rotation of all the pairs of capstans 14. Each control card 22 is connected at outlet, with a feedback ring, to the hydraulic circuits and the feed means, for example the pump 15, and the corresponding valve 17 to adjust the pressure.

The balancing and synchronizing device 20 also comprises a synchronization command 30, which when activated acts on one of the electronic control cards 22 so as to make it function as a main control unit 22a, which, through the data transmission and reception line 25, carries out the synchronous control of the pairs of capstans 14 driven by the other control cards 22.

Figure 4:
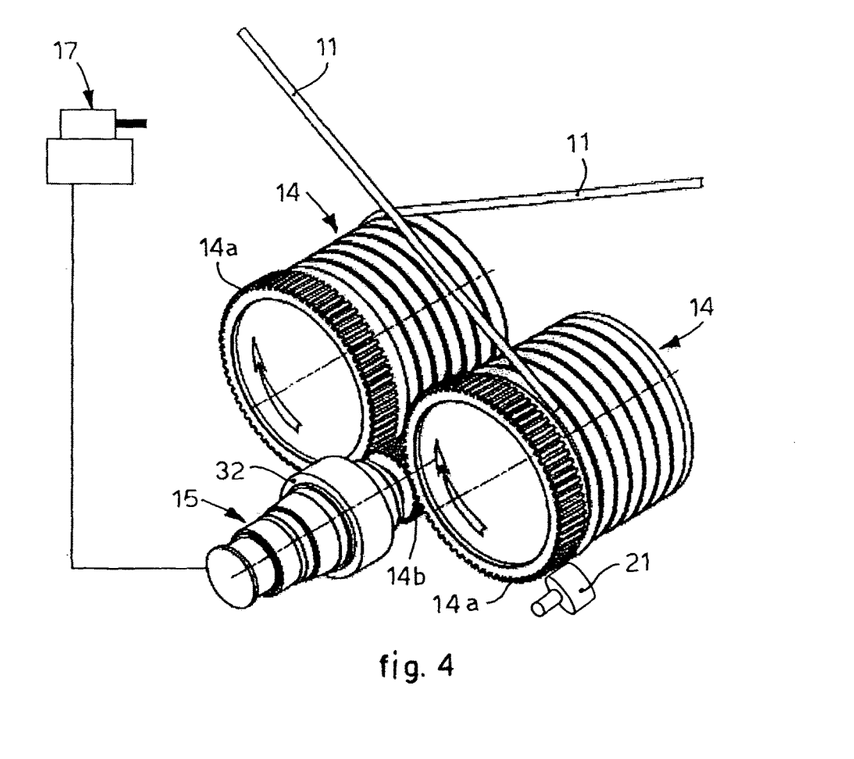
FIG. 4 is a three-dimensional view of an enlarged detail of a pair of capstans.
Figure 5:
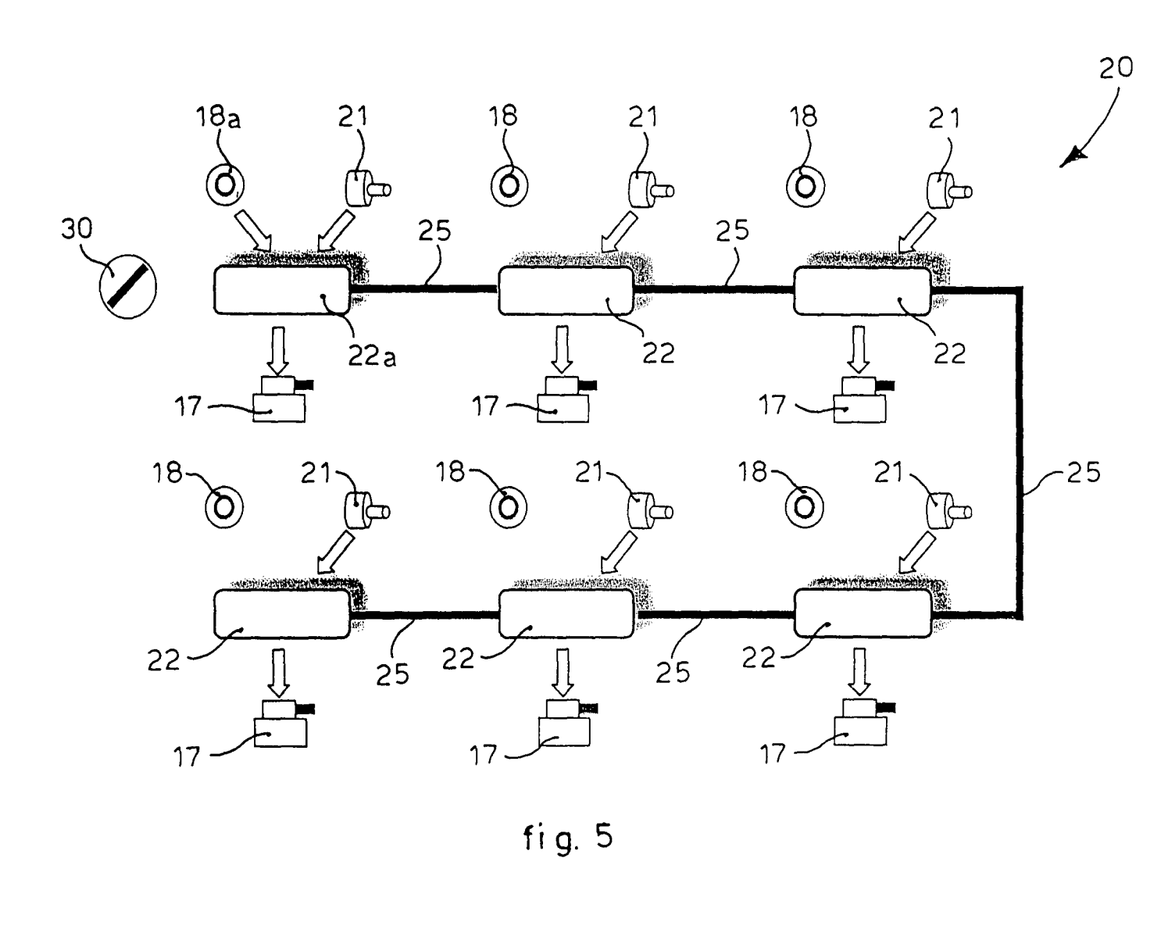
FIG. 5 is a schematic diagram of the balancing and synchronizing device for connected multiple circuits.

The synchronization command 30 is also suitable to selectively activate the use of each adjustment potentiometer 18. In particular, as shown in FIG. 4, the synchronization command 30 enables for use, by an operator, only the specific potentiometer 18a directly connected to the main control card 22a, disabling the use of the potentiometers 18 of the other control cards. This enabling is made by transmitting a synchronization message or signal from the main control card 22a, through the data transmission and reception line 25 to the other control cards 22.

Even without being driven by the corresponding potentiometer, each control card 22 adjusts its own adjustment valve 17 according to the pressure values, and hence traction, on the conductor 11, set by the potentiometer 18a of the main control card 22a.

The balancing and synchronizing device 20 applied to a laying plant 10 as described heretofore is used as follows.

The conductors 11, fed by the reels 19, are wound according to known techniques onto the respective capstans 14 of each individual brake machine 12, and the leading ends of each of them are connected to the head-board 31 and consequently to the drawing cable, as in the case shown in FIG. 1, or to the relative drawing cables 16, or the old conductors to be replaced, as in the case shown in FIG. 2; the drawing cable or cables 16 are in turn gripped on each of the winch machines 13.

When laying is started, the conductors 11 are balanced opposite the brake machine 12, and during stretching they are made to pass through pulleys positioned at the ends of the brackets of the pylons 23.

The winding of the drawing cable/cables 16 onto the winch machines 13 thus generates a traction of the conductors from the brake machine/machines 12 to the winch machine/machines 13.

During the laying operation the value of the release tension of the conductors 11 to the brake machine/machines 12 is controlled by the respective valves 17, which exert a hydraulic working pressure proportional to the signal associated to the corresponding potentiometers 18 due to the effect of the hydraulic oil feed generated by the relative hydraulic pumps 15 connected to the rotating capstans.

The synchronization command 30 is driven by acting on the main control card 22a, determining the transmission of the synchronization signal to the other control cards 22. When the synchronization signal is received, the potentiometers 18 of the connected control cards 22 are disabled and the corresponding control cards 22 adjust the pressure of each connected valve 17 according to the positioning values detected by the associated position detector 21, and also according to the functional and operating parameters set on the main control card 22a by means of the relative potentiometer 18a, such as for example the desired traction value on each cable during laying.

Each control card 22, including the main control card 22a, is able to verify instantaneously by means of the position detectors 21 of the capstans 14, both the laying speed of an associated conductor 11, and also its actual laying length. These values are compared, in a dynamic manner instant by instant, with a reference laying speed and/or with a reference length, for example with that of one of the conductors that are laid, or with a mean value associated with a plurality of conductors. In this way, the balancing and synchronizing device 20 according to the invention is able to balance and synchronize substantially automatically the laying of the various conductors 11 by means of the dynamic adjustment of the pressure of each associated valve 17 by the control cards 22.

It is therefore possible to adjust dynamically and independently for each mechanical circuit, that is, for each pair of capstans 14, the winding or unwinding speeds of the capstans 14 so as to guarantee a uniform laying with the same geometries of the catenaries.

Figure 6:
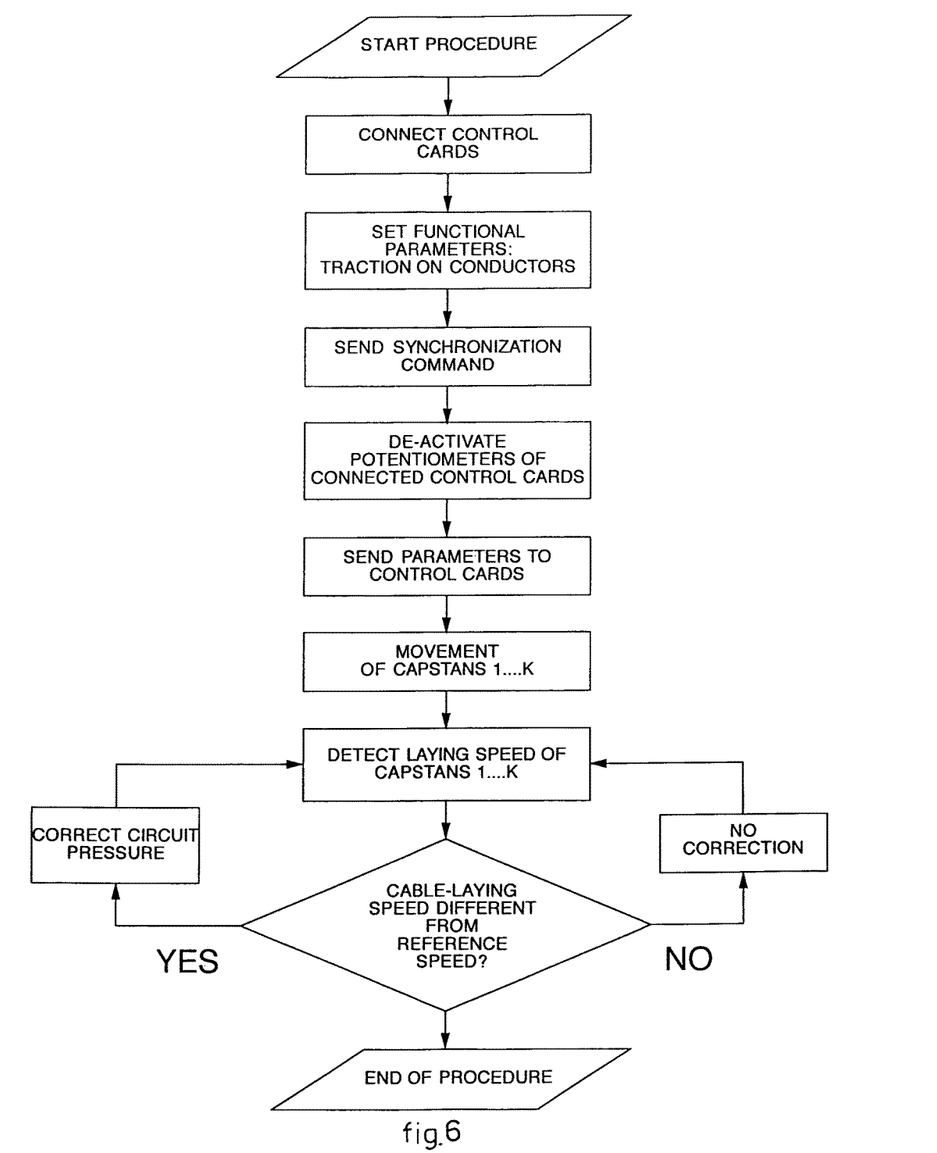
FIG. 6 is a flow chart that shows the functioning of the balancing and synchronizing device.

FIG. 6 shows a possible flow chart showing the functioning of the balancing and synchronizing device applied to the laying plant 10 as previously described.

It is clear that modifications and/or additions of parts may be made to the balancing and synchronizing device 20 as described heretofore, without departing from the field and scope of the present invention.

It is also clear that, although the present invention has been described with reference to some specific examples, a person of skill in the art shall certainly be able to achieve many other equivalent forms of balancing and synchronizing device 20, having the characteristics as set forth in the claims and hence all coming within the field of protection defined thereby.

The invention claimed is:

1. A balancing and synchronizing device for a plant comprising: at least one winch machine, the at least one winch machine being configured to wind at least one drawing-cable; a plurality of brake machines, the plurality of brake machines being configured to lay cables, each of the plurality of brake machines comprising a plurality of unwinding members, each of the plurality of unwinding members having at least one pair of capstans, the plurality of brake machines and the at least one winch machine being positioned on opposite sides with respect to pylons; at least one control unit of the electronic card type for each pair of capstans of each of the plurality of brake machines, the at least one control unit being configured to automatically adjust an unwinding tension of each cable by a relative pair of capstans; a mating plurality of user interface means independently connected to each at least one control unit to set predetermined functional and operating parameters of each at least one pair of capstans, each control unit being connected to corresponding detector elements of a corresponding pair of capstans of each brake machine; and a data transmission and reception line to which the at least one control unit of the brake machines is connected for at least a part of a laying cycle, wherein one control unit of the at least one control unit is selected as a main control unit, the main control unit is provided with a synchronization command able to command, through the data transmission and reception line, one or more other control units of the at least one control unit for the synchronized balancing and driving of the relative pairs of capstans, on the basis of specific functional and operating parameters set by the user interface means of the main control unit, the user interface means of the other control units is disabled on the basis of signals received from each of the detector elements to render laying modes of all cables substantially uniform, the user interface means of the main control unit includes at least one potentiometric adjuster able to adjust a working pressure of hydraulic drive circuits associated with the pairs of capstans so that a traction is applied to each cable, and the main control unit includes a main potentiometer, and the synchronization command enables the main potentiometer of the main control unit and disables each of at least one potentiometers of each of the other control units.

2. The device as in claim 1, wherein each detector element is also able to detect at least one of an instantaneous laying speed and a length of each cable laid, and to transmit data, by means of an associated control unit of the at least one control unit and through the data transmission and reception line, to the other control units in order to instantly compare said at least one of said instantaneous laying speed and the length of the cable laid with at least one of a reference laying speed and a reference laying length.

3. The device as in claim 1, wherein the data transmission and reception line includes a cable.

4. The device as in claim 1, wherein the data transmission and reception line includes a radio-frequency line.

5. The device as in claim 1, wherein the data transmission and reception line comprises a cabled sub-line and a radio-frequency sub-line connected with each other.

\* \* \* \* \*